US012768648B2

(12) United States Patent
Berkson

(10) Patent No.: US 12,768,648 B2
(45) Date of Patent: Oct. 20, 2026

(54) STRUCTURED LIGHT AUTOCOLLIMATOR

(71) Applicant: Fringe Metrology LLC, Tucson, AZ (US)

(72) Inventor: Joel David Berkson, Tucson, AZ (US)

(73) Assignee: FRINGE METROLOGY LLC, Tucson, AZ (US)

( * ) Notice: Subject to any disclaimer, the term of this patent is extended or adjusted under 35 U.S.C. 154(b) by 0 days.

(21) Appl. No.: 19/443,428

(22) Filed: Jan. 8, 2026

(65) Prior Publication Data

US 2026/0287339 A1 Sep. 24, 2026

Related U.S. Application Data

(60) Provisional application No. 63/774,616, filed on Mar. 19, 2025.

(51) Int. Cl.

| | |
|---|---|
| ***G01B 11/30*** | (2006.01) |
| ***G01B 11/26*** | (2006.01) |
| ***G02B 27/14*** | (2006.01) |
| ***G02B 27/30*** | (2006.01) |
| ***H04N 23/55*** | (2023.01) |

(52) U.S. Cl.

CPC ............ *G01B 11/306* (2013.01); *G01B 11/26* (2013.01); *G02B 27/14* (2013.01); *G02B 27/30* (2013.01); *H04N 23/55* (2023.01)

(58) Field of Classification Search

CPC ...... G01B 11/306; G01B 11/26; H04N 23/55; G02B 27/14; G02B 27/30

See application file for complete search history.

(56) References Cited

U.S. PATENT DOCUMENTS

| | | | | |
|---|---|---|---|---|
| 5,561,525 A * | 10/1996 | Toyonaga | G01B 11/2441 356/512 |
| 5,710,631 A * | 1/1998 | Bou-Ghannam | G01N 21/88 356/516 |
| 7,751,645 B2 | 7/2010 | Reneker et al. | |

(Continued)

FOREIGN PATENT DOCUMENTS

| | | | |
|---|---|---|---|
| CN | 104406541 | 2/2017 | |
| EP | 4478290 A1 * | 12/2024 | G03B 43/00 |

*Primary Examiner* — Michael A Lyons
*Assistant Examiner* — Jarreas C Underwood
(74) *Attorney, Agent, or Firm* — NGUYEN TARBET IP LAW

(57) ABSTRACT

A system for measurement of reflective and transparent surfaces, including a light source for generating a light pattern. The system further includes a group of primary optical elements optically coupled to the light source and the optical surface for converting the light pattern into angularly encoded light and directing it to the optical surface. The optical surface reflects the angularly encoded light back toward the primary optical elements to collect and focus the reflected angularly encoded light onto an image plane. The system further includes an aperture stop located at the image plane, configured to make an object space of the system telecentric. The system further includes secondary optical elements optically coupled to the image plane, configured to relay the image plane. The system further includes a camera sensor optically coupled to the secondary optical elements, configured to receive the image plane and measure properties of the optical surfaces.

19 Claims, 11 Drawing Sheets

(56) References Cited

U.S. PATENT DOCUMENTS

| | | | | |
|---|---|---|---|---|
| 8,508,749 | B2 | 8/2013 | Arnold et al. | |
| 8,537,369 | B1 * | 9/2013 | Tang | G01B 11/0675 356/511 |
| 9,261,352 | B2 | 2/2016 | Burry et al. | |
| 2004/0174534 | A1 * | 9/2004 | Aoki | G03F 7/706 356/515 |
| 2011/0050885 | A1 * | 3/2011 | McEldowney | G06V 10/145 382/106 |
| 2015/0131055 | A1 * | 5/2015 | Catanzariti | A61B 3/0091 351/212 |
| 2015/0308006 | A1 | 10/2015 | Cohen et al. | |
| 2022/0412897 | A1 * | 12/2022 | Diop | G01N 21/958 |
| 2024/0122757 | A1 | 4/2024 | Buck et al. | |
| 2024/0426701 | A1 * | 12/2024 | Huang | G01B 11/2527 |

* cited by examiner

STRUCTURED LIGHT AUTOCOLLIMATOR

CROSS-REFERENCE TO RELATED APPLICATIONS

This application is a non-provisional and claims benefit of U.S. Provisional Application No. 63/774,616 filed Mar. 19, 2025, the specification of which is incorporated herein in its entirety by reference.

FIELD OF THE INVENTION

The present invention is directed to enabling high-resolution, high-accuracy measurement of reflective and transmissive surface geometry—including slope, form, roughness, and total thickness variation—with greater robustness, dynamic range, precision, and ease of calibration than existing optical metrology systems. The invention can additionally be used for defect detection.

BACKGROUND OF THE INVENTION

As technology rapidly advances toward smaller, faster, and cheaper, the requirements on the components, and therefore the systems that verify them, become ever tighter. This is especially true for precision surfaces such as telescope mirrors, microscopes, AR/VR displays, and semiconductors. These surfaces are the baseline that defines the capability of next generation astronomical, biomedical, and educational systems, and are the bedrock of efficient production of AI and quantum chips. If the critical surfaces that are involved in these advancing technologies cannot be measured, then they cannot be made to meet specifications. The surface measurement challenges in these fields include but are not limited to: speed, accuracy, sensitivity, dynamic range, cost, and environmental robustness. These requirements pose significant challenges to nearly all existing optical metrology techniques, including, for example, interferometry, confocal sensors, capacitive sensors, autocollimators, triangulation sensors, etc.

While capable of nanometer precision, interferometers are extremely sensitive to environmental vibration, air turbulence, and temperature drift, since they measure optical path length. They also have limited dynamic range and require optical isolation, making them unsuitable for in-process or production-floor measurements. To mitigate vibration and air sensitivity, interferometer designs have incorporated active vibration isolation tables, phase-shifting techniques with near-instant fringe capture, and environmental enclosures. While these solutions improve stability, they greatly increase cost and complexity, and still cannot tolerate production-floor conditions. Dynamic range remains limited by fringe ambiguity, preventing accurate measurement of surfaces with large slopes or discontinuities. This can only be solved on a case-by-case basis, optimized for a specific expected shape, such as with a null lens or a computer generated hologram (CGH).

Deflectrometry can capture precise slope information with a large dynamic range but suffers from complex calibration requirements, since the screen used for pattern projection is not imaged directly by the camera. As a result, small geometric or alignment errors lead to significant low-order shape inaccuracies. The off-axis geometry further complicates slope integration (required to recover the full surface geometry) and causes non-uniform spatial sampling. Researchers have attempted to improve calibration accuracy by using multiple cameras, reference mirrors, or structured calibration targets to determine the screen-to-camera geometry. These methods still require extensive mathematical modeling, alignment procedures and compensation for perspective distortion, or the change in magnification with distance. Small calibration errors propagate as large low-order shape errors, making the method unreliable for absolute surface form measurements. Since the systems are not self-referencing, it is prone to mechanical drift that cannot be easily resolved via calibration. Systems that use multiple cameras can overcome some of these challenges, but they require search algorithms in order to get accurate results, which is too computationally intensive for production environments.

Point-based measurement devices can achieve good local precision but require mechanical scanning to cover an area. This greatly reduces measurement speed and introduces errors from mechanical motion, thermal drift, and vibration. These sensors also struggle to maintain accuracy across surfaces with large form variations or steep slopes. Systems using confocal, capacitive, or triangulation sensors have addressed the need for broader coverage by employing automated scanning stages or multi-point arrays. These solutions introduce additional moving parts that require regular maintenance, alignment errors, and cost, and they remain too slow for full-field metrology of large or complex surfaces.

Conventional autocollimators are highly sensitive slope measurement systems, but can measure only an average surface slope over the entire illuminated area, rather than spatially resolved slope fields. This makes it impossible to reconstruct detailed surface profiles or detect localized variations such as bow, warp, or thickness gradients. None of the existing systems simultaneously provide high spatial resolution, large dynamic range, environmental robustness, and ease of calibration in a single optical configuration.

Bright-field inspection systems often use telecentric imaging lenses and either in-line or adjacent light fields in order to reveal defects on surfaces, such as particles, scratches or contamination. Light from areas without defects returns to the sensor (bright), and light from defects does not (dark). These inspection systems are typically standalone, and only serve the purpose of defect inspection.

BRIEF SUMMARY OF THE INVENTION

It is an objective of the present invention to provide systems that allow for high-resolution, high-accuracy measurement of reflective and transmissive surface geometry—including slope, form, roughness, and total thickness variation—with greater robustness, dynamic range, and ease of calibration than existing optical metrology systems, as specified in the independent claims. Embodiments of the invention are given in the dependent claims. Embodiments of the present invention can be freely combined with each other if they are not mutually exclusive.

The present invention features a system for measurement of an optical surface. The system may comprise a light source configured to generate a light pattern based on a spatially encoded structured light pattern. The system may further comprise a group of primary optical elements optically coupled to the light source and the optical surface, configured to convert the light pattern into angularly encoded light and direct the light pattern to the optical surface such that the angularly encoded light comprises source angles of the optical surface. The optical surface may reflect the angularly encoded light back toward the group of primary optical elements. The group of primary optical elements may be further configured to collect and focus the reflected angularly encoded light onto an image plane of the group of primary optical elements. The system may further comprise an aperture stop located at the image plane, configured to make the object space of the system substantially telecentric such that the chief ray angles are made parallel. The system may further comprise one or more secondary optical elements optically coupled to the image plane, configured to relay the image plane. The system may further comprise a camera sensor optically coupled to the one or more secondary optical elements, configured to receive the image plane and measure properties of the optical surface based on the encoded source angles.

The present invention features a new type of surface metrology system: a structured light autocollimator (SLA). A traditional autocollimator typically comprises a collimating lens, a beamsplitter, a point source, and either a sensor at the focal plane of the collimating lens or a reticle with another lens that recollimates the light for view with the human eye (as shown in FIG. 1). The point source is reflected by the beamsplitter and collimated by the collimation lens toward the surface under test. If the surface that the autocollimator is pointed toward is perfectly aligned with the autocollimator axis, then the beam returns to focus on a position, in transmission through the beamsplitter, that is also on the same axis. The deviation from that on-axis position (either indicated by a reticle or a pixel position on a sensor) directly indicates the angular alignment error of the test surface, if the focal length of the collimating lens is known. Thus, an autocollimator is inherently a slope measurement system.

However, this system only returns one average slope value for the entire surface. If one is interested in profiling the surface shape with a high lateral resolution, it is impossible with a traditional autocollimator. This invention includes major modifications to a traditional autocollimator that make it a high-resolution slope measurement system. Thus, integrating those slopes yields a high-resolution depth map for the surface under test. The major modifications are at least one of placing the aperture stop substantially at the focal plane of the collimating lens in a typical autocollimator to make it substantially telecentric, restricting the accepted chief ray angles into the system as reflected from the surface to be parallel, and using a structured light pattern to encode source angles, and decode that pattern as a slope after reflection from the surface.

Instead of relying on interference fringes that are highly vibration-sensitive, the present invention measures surface slope rather than optical path difference. This makes it inherently robust to air turbulence and mechanical vibration. The dynamic range is determined by the ratio of source size to focal length, allowing measurement of surfaces with far larger angular deviations than interferometers can tolerate. Comparing to deflectometry, the Structured Light Autocollimator (SLA) eliminates the need for triangulation between a separate screen and camera. By placing the structured light source and the camera within a single telecentric optical path, the geometry is intrinsically fixed and self-referencing. This greatly simplifies calibration and eliminates the ambiguous camera-to-screen mapping that limits deflectometry accuracy.

A conventional autocollimator measures only the average slope of the illuminated area. The present invention replaces the single point source with a spatially encoded display that projects sinusoidal or binary structured-light patterns. Each pixel of the display corresponds to a distinct outgoing ray angle, allowing per-pixel slope measurement across the field without mechanical scanning. Because the system captures millions of slope data points in a single exposure sequence, it removes the need for mechanical motion and achieves orders-of-magnitude faster measurement speed compared to single-point sensors. The telecentric design maintains consistent magnification and alignment across the field, ensuring measurement accuracy over large apertures and varying surface curvatures. Residual optical and alignment errors are corrected through a per-pixel polynomial calibration model, with coefficients compressed via Zernike polynomials to ensure smoothness and data efficiency. This calibration framework allows precise slope correction at every pixel, yielding nanometer-level absolute accuracy after slope integration, as well as high-speed use of the calibration data via a simple Hadamard product, rather than a search algorithm.

A stable, fast, and easy to apply calibration is needed for this system to work with high accuracy. A per-pixel polynomial slope-error model to correct slope-dependent and field-dependent errors (aberrations, distortions, alignment, retrace error), with coefficient maps is compressed onto different modes (i.e., Zernikes, fitting, Hadamard product, etc.) to enforce smoothness and data efficiency. This yields corrected slope fields suitable for accurate integration and high speed metrology. Integration of the corrected slope field (modal or zonal integration) to recover absolute surface form with high fidelity (bow/warp/figure/nanotopography).

One of the unique and inventive technical features of the present invention is the implementation of an aperture stop placed at the focal plane of the collimating optics in an autocollimator for the measurement of reflective/refractive surfaces. Without wishing to limit the invention to any theory or mechanism, it is believed that the technical feature of the present invention advantageously provides for a one-to-one mapping between source angular displacement and the accepted chief ray angle such that each surface slope maps deterministically to the sensor. None of the presently known prior references or works have the unique inventive technical feature of the present invention.

Furthermore, the inventive technical feature of the present invention contributed to a surprising result. One of ordinary skill in the art would expect that limiting the light transmitted at the focal plane of the collimating optics would reduce the efficacy of slope measurement by reducing the number of light rays measured by the camera sensor. The present invention limits the number of light rays transmitted to the camera sensor from the optical surface by an aperture stop at the focal plane of the collimating optics. Surprisingly, this allows for a high-resolution slope measurement system for optical surfaces in the autocollimator system of the present invention. Thus, the inventive technical feature of the present invention contributed to a surprising result.

One of the unique and inventive technical features of the present invention is the replacement of the point source with a spatially encoded display that projects phase-shifted (or binary) patterns such that each display pixel corresponds to a distinct outgoing ray angle. Using the known focal length of the collimating optics and the pattern projected on the display, the source displacement (on the display) is converted into surface slope (x,y) at each image pixel. This closes the loop between structured encoding and the autocollimator's slope physics. Without wishing to limit the invention to any theory or mechanism, it is believed that the technical feature of the present invention advantageously provides for the system to identify, per camera pixel, which source angle returned through the telecentrically placed aperture stop. None of the presently known prior references or works have the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

Figure 6A:
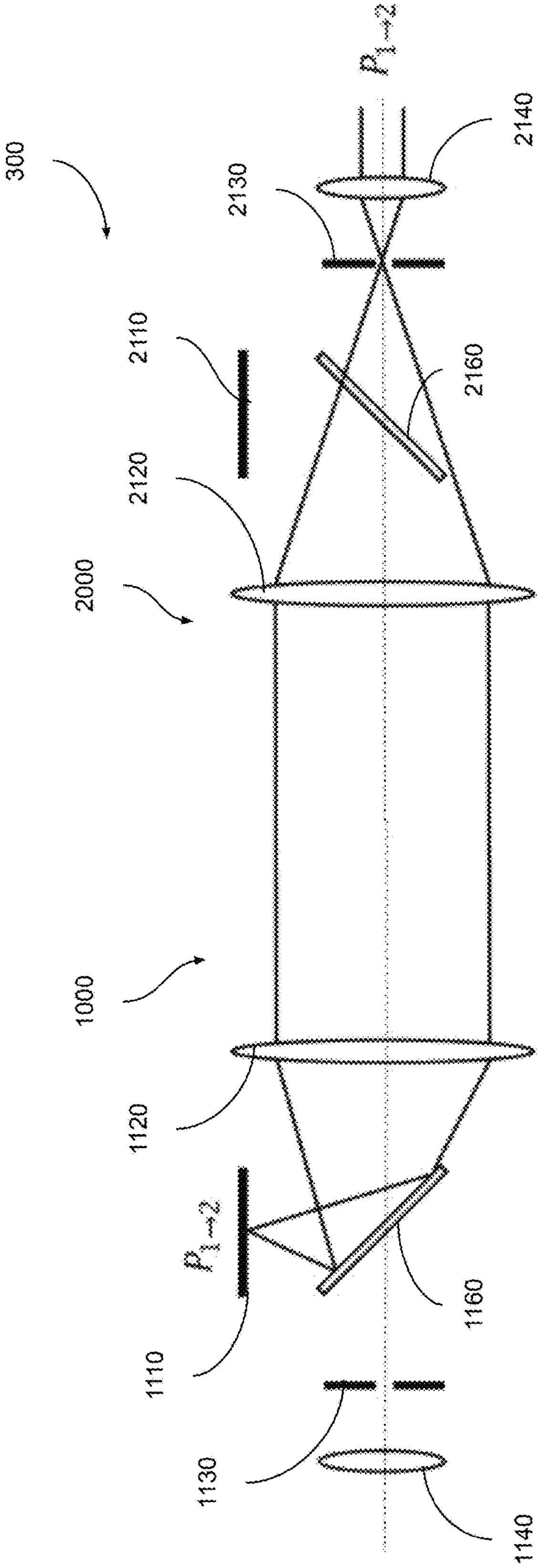
Figure 6B:
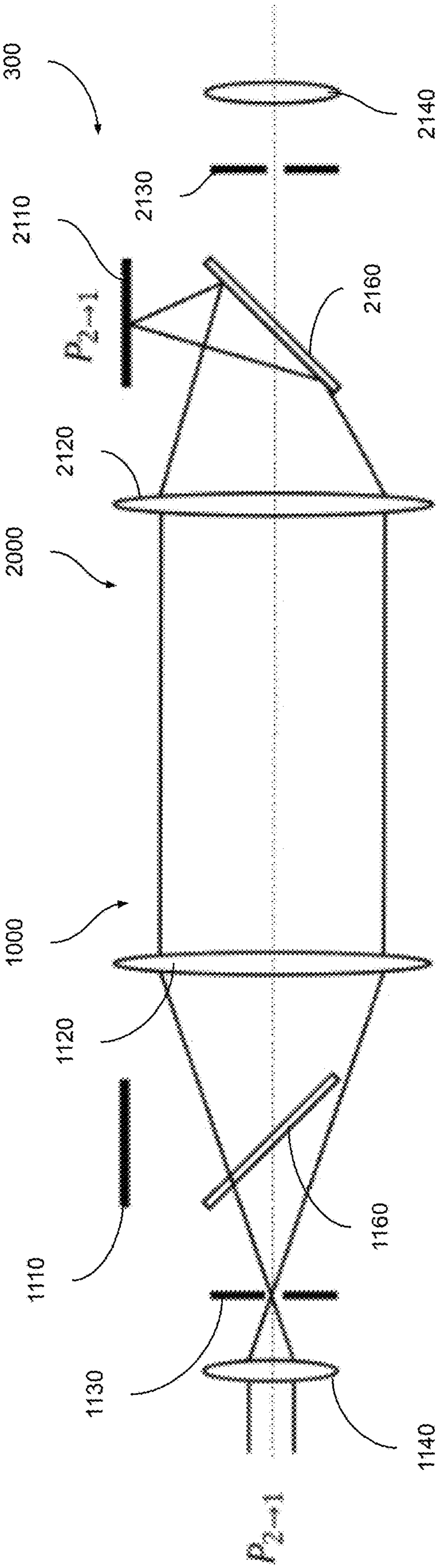

FIGS. 6A-6B show a schematic view of the process for calibrating a particular embodiment, which includes two structured light autocollimator systems to work in unison. Unit 1 projects a pattern toward unit 2, and then unit 2 projects a pattern toward unit 1. This information is used to establish a reference angle for the alignment between the two systems.

Figure 7:
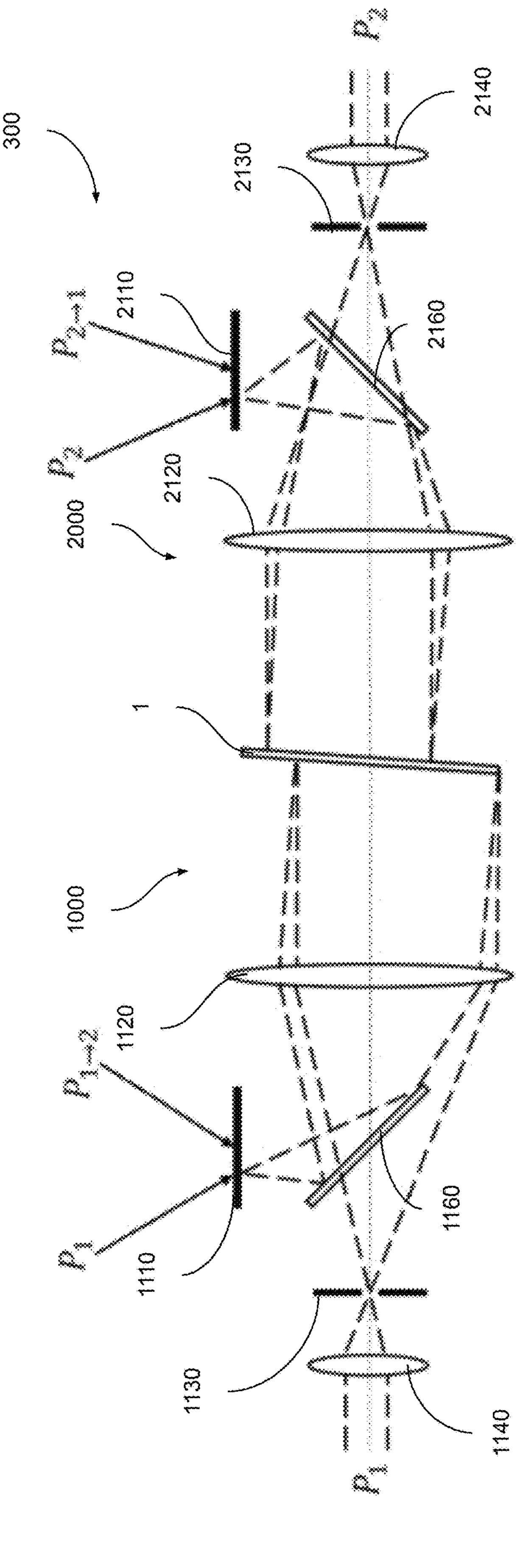

FIG. 7 shows a schematic view of a particular embodiment, wherein an opaque, dual-sided reflective object is placed between two structured light autocollimator systems. The shape of each side is measured by each system. The measured slopes on each side are offset by the calibration to retrieve the true total thickness variation (TTV).

Figure 8A:
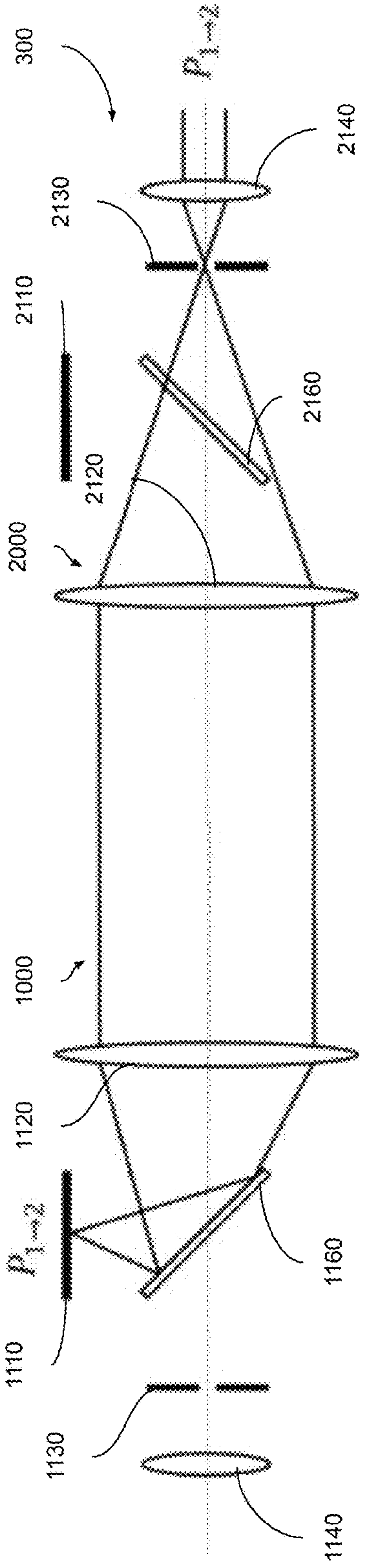
Figure 8B:
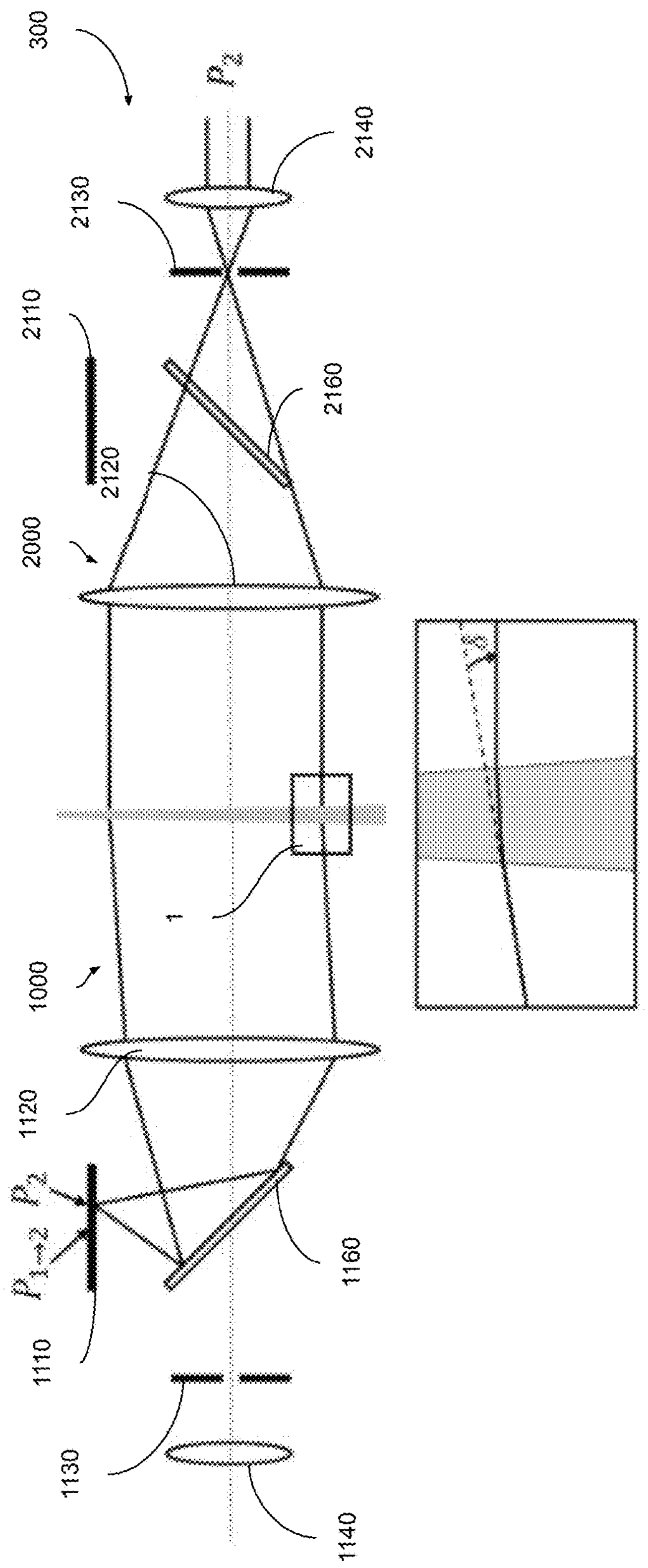

FIGS. 8A-8B shows a schematic view of a particular embodiment, wherein two structured light autocollimator systems are configured to measure transmitted wavefront error. In this particular embodiment, the system is measuring the deviation from a wedged window.

Figure 9:
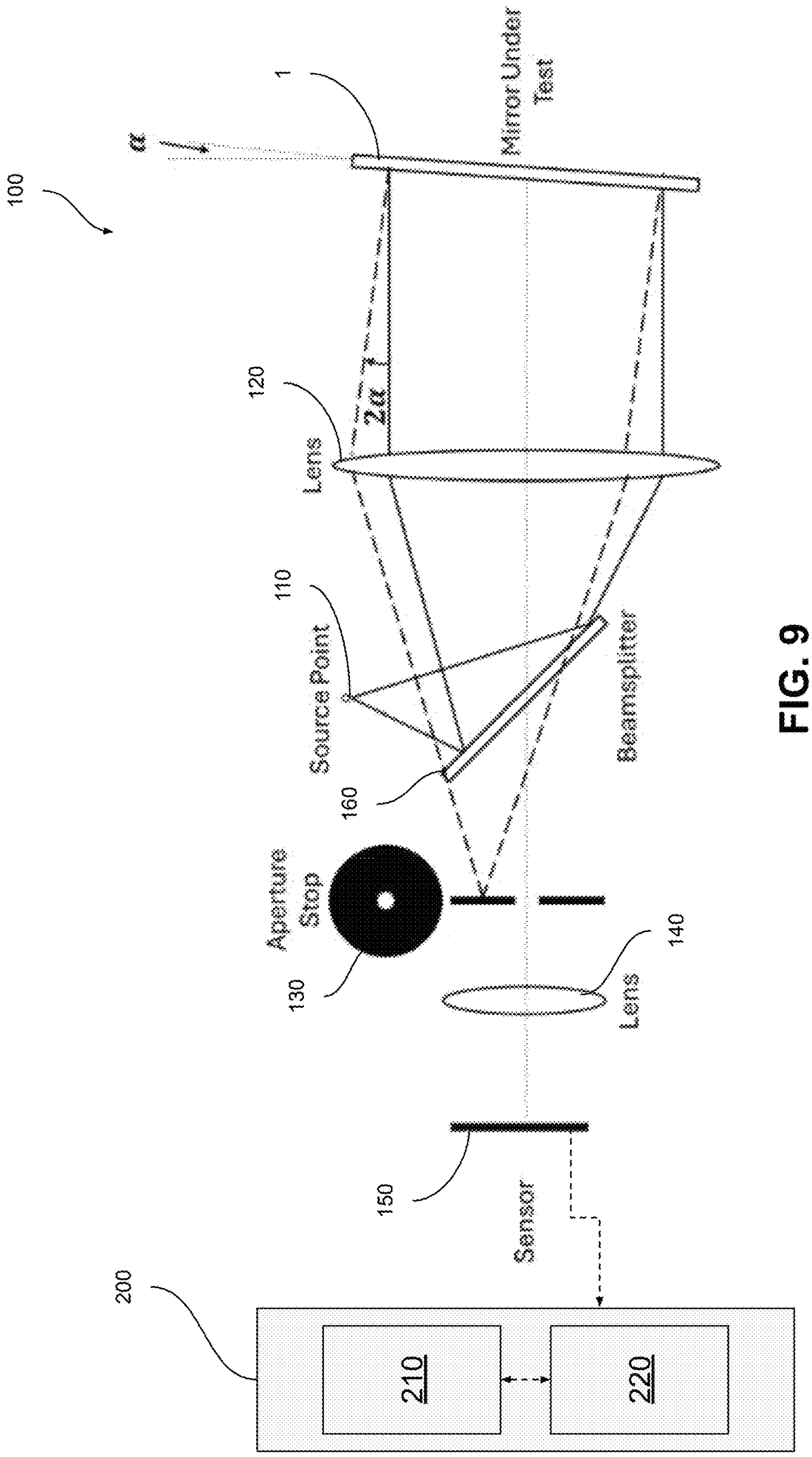

FIG. 9 shows an embodiment of the autocollimator of the present invention comprising a computing device communicatively coupled to the camera sensor.

DETAILED DESCRIPTION OF THE INVENTION

Following is a list of elements corresponding to a particular element referred to herein:

1 optical surface
100 system
110 light source
120 group of primary optical elements
130 aperture stop
140 secondary optical elements
150 camera sensor
160 beamsplitter
200 computing devices
300 system
1000 first system
1110 light source
1120 group of primary optical elements
1130 aperture stop
1140 secondary optical elements
1160 beamsplitter
2000 second system
2110 light source
2120 group of primary optical elements
2130 aperture stop
2140 secondary optical elements
2160 beamsplitter The term "focal plane" is defined herein as the plane through the focus perpendicular to the axis of a mirror or lens.

The term "image plane" is defined herein as the plane that contains the object's projected image, which lies beyond the back focal plane.

The term "chief ray angles" is defined herein as a specific ray of light that originates from an object point and passes through the aperture stop of the optical system.

The term "telecentric" is defined herein as having a constant, non-angular field of view at any distance from the lens.

The term "bi-telecentric" is defined herein as having a constant, non-angular field of view at any distance from both the lens and the object being measured.

The term "object space" is defined herein as the space in relation to an optical system in which are located the objects to be imaged by the system.

Figure 1:
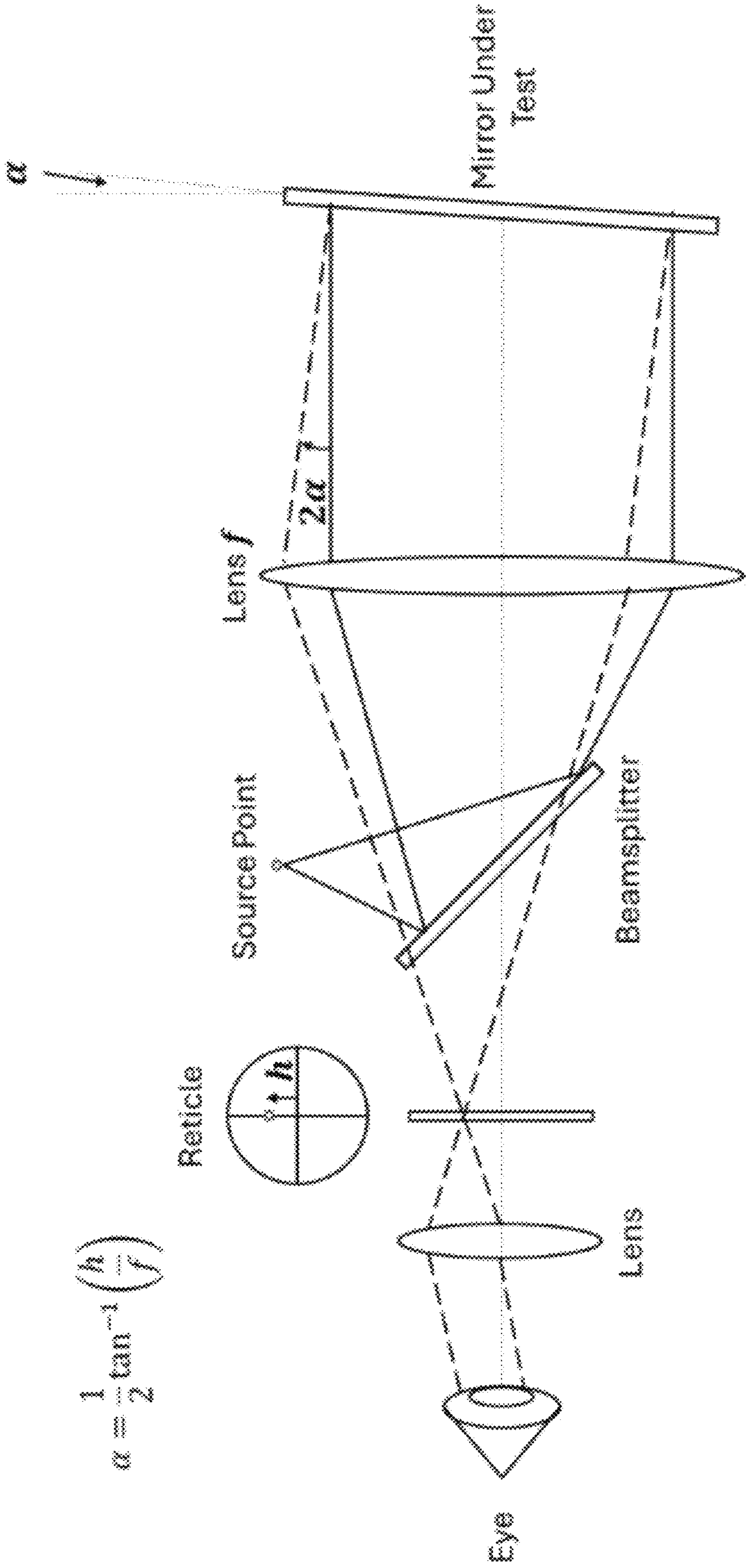
FIG. 1 Prior Art
FIG. 1 shows a schematic view of a state of the art autocollimator.
Figure 2:
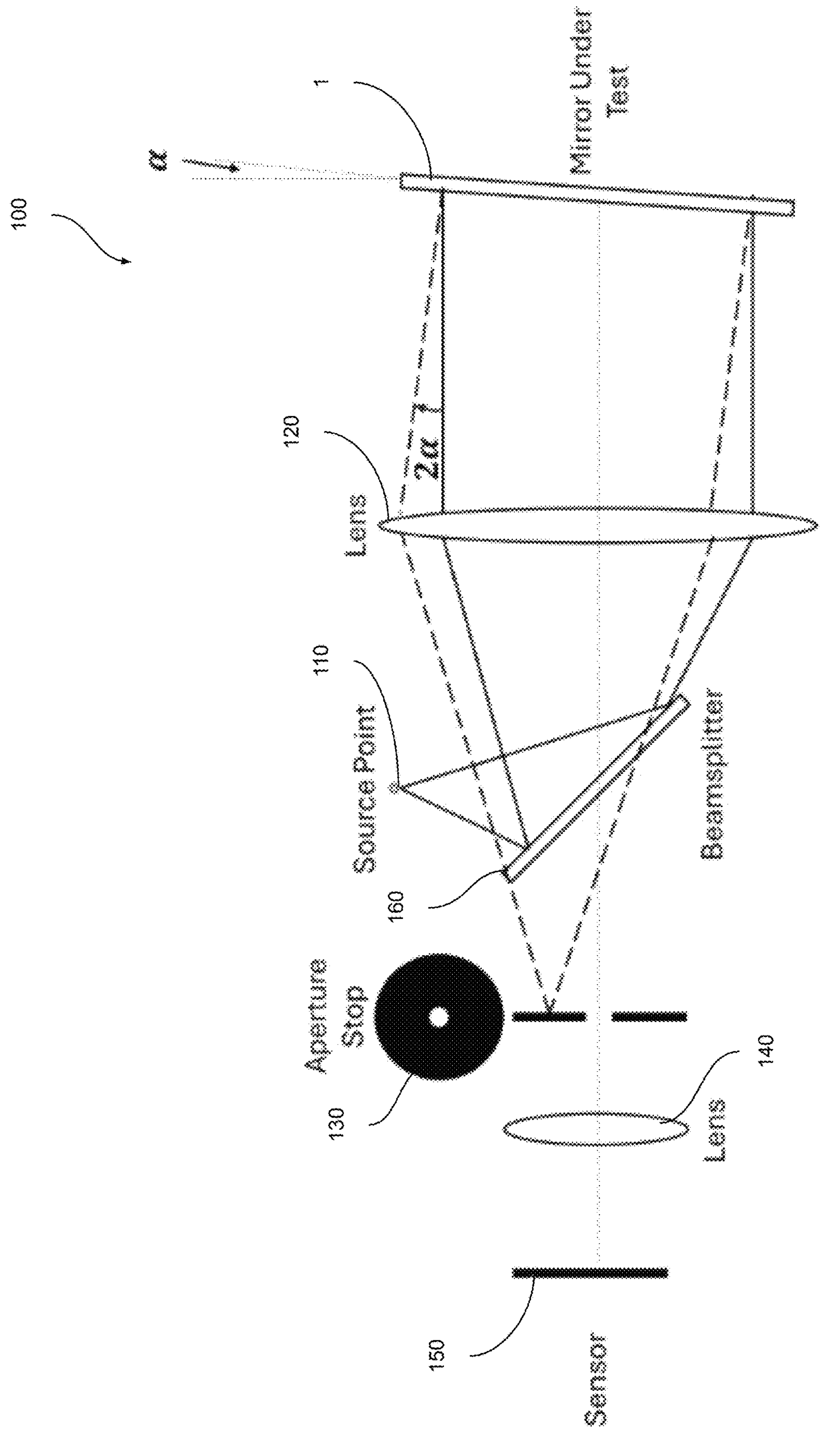
FIG. 2 shows a schematic view of an autocollimator with a stop located at the focal plane of the collimating lens, making the system telecentric.

Referring now to FIG. 2, the present invention features a system (100) for measurement of one or more properties of an optical surface (1). The one or more properties may comprise slope, form, and total thickness variation. In some embodiments, the system (100) may comprise a light source (110) configured to generate light based on a spatially encoded structured light pattern, defining a transmission path. The system (100) may further comprise a group of primary optical elements (120) optically coupled to the light source (110) and the optical surface (1), configured to convert the light into angularly encoded light and direct the light to the optical surface (1) such that the angularly encoded light encodes source angles of the optical surface (1), the source angles comprising one or more chief ray angles. The optical surface (1) may reflect the angularly encoded light back toward the group of primary optical elements (120), defining a reflected path. The group of primary optical elements (120) may be further configured to collect and focus the reflected angularly encoded light onto an image plane of the group of primary optical elements (120). The system (100) may further comprise an aperture stop (130) located at the image plane, configured to make an object space of the system (100) substantially telecentric such that the one or more chief ray angles are made parallel. The system (100) may further comprise one or more secondary optical elements (140) optically coupled to the image plane, configured to relay the image plane. The system (100) may further comprise a camera sensor (150) optically coupled to the one or more secondary optical elements (140), configured to receive the image plane and measure the one or more properties of the optical surface (1) based on the encoded source angles.

In some embodiments, the system (100) may further comprise a beamsplitter (160) positioned between an image plane of the group of primary optical elements (120) and the group of primary optical elements (120) such that at least one light path of the light is transmitted and at least one light path of the light is reflected. In some embodiments, the aperture stop (130) may be positioned at a focal plane of the one or more secondary optical elements (140) such that the object space of the system (100) is made bi-telecentric. In some embodiments, the optical surface may be positioned depending on the depth of field of the group of primary optical elements (120), determined by the following equation: $DOF=B*f/\#_w$, where B is the blur criterion and f/#_w is the working f-number of the group of primary optical elements (120). In some embodiments, the light source (110) may be positioned in the transmission path and the camera sensor (150) may be positioned in the reflected path. In some embodiments, the light source (110) may be positioned in the reflected path, and the camera sensor (150) may be positioned in the transmission path.

Referring now to FIG. 9, in some embodiments, the system (100) may further comprise at least one computing device (200) communicatively coupled to the camera sensor (150), comprising a processor (210) configured to execute computer-readable instructions and a memory component (220) operatively coupled to the processor (210), comprising a set of computer-readable instructions. When executed by the processor (210), the computer-readable instructions may cause the at least one computing device (200) to display the spatially encoded structured light pattern and acquire an image from the camera sensor (150) comprising the spatially encoded structured light pattern transmitted through the group of primary optical elements (120), reflected from the optical surface (1) to the camera sensor (150).

In some embodiments, the computer-readable instructions may further comprise calculating a corresponding position on the light source (110) for each pixel in the camera sensor (150) by converting angularly encoded light information from the light into spatially encoded information. The computer-readable instructions may further comprise calculating the slope of the optical surface (1) based at least in part from the corresponding position of each pixel and a focal length of the group of primary optical elements (120). The computer-readable instructions may further comprise producing a depth map of the optical surface (1) using at least the slope and the corresponding position of each pixel. In some embodiments, producing the depth map may comprise integrating the slope using the corresponding position of each pixel. In some embodiments, calculating the corresponding position on the light source (110) for each pixel of the camera sensor (150) may comprise using spatial phase unwrapping with a global phase reference, temporal phase unwrapping using multifrequency or multiwavelength methods, binary encoding, randomized binary coding, or a combination thereof.

The present invention features a system (300) for measuring total thickness variation and object parallelism. The system (300) may comprise a first system (1000) and a second system (2000), each defined above, positioned such that the first system (1000) is pointed directly at the second system (2000), wherein the optical surface (1) is positioned between the first system (1000) and the second system (2000) such that a first side faces the first system (1000) and a second side faces the second system (2000). In some embodiments, the optical surface (1) may be located at a focal plane of a group of primary optical elements (1120) of the first system (1000) and a group of primary optical elements (2120) of the second system (2000). In some embodiments, an alignment between the first system (1000) and the second system (2000) may be calibrated. In some embodiments, the computer-readable instructions may further comprise calculating the corresponding position on the light source for each pixel in the camera sensor for each system. The computer-readable instructions may further comprise calculating a surface slope of the optical surface (1) based on the corresponding position of each pixel and a focal length of a group of primary optical elements (1120) of the first system (1000) and a group of primary optical elements (2120) of the second system (2000). The computer-readable instructions may further comprise producing a depth map of the optical surface (1) using at least the surface slope and the position of each pixel for each unit. The computer-readable instructions may further comprise producing a measurement of parallelism and total thickness variation using at least the calibrated alignment between the first system (1000) and the second system (2000).

The present invention features a system (300) for measuring transmitted wavefront error. The system (300) may comprise a first system (1000) and a second system (2000), each defined above, positioned such that the first system (1000) is pointed directly at the second system (2000), wherein the optical surface (1) is positioned between the first system (1000) and the second system (2000) such that a first side faces the first system (1000) and a second side faces the second system (2000). In some embodiments, the optical surface (1) may be located at a focal plane of a group of primary optical elements (1120) of the first system (1000) and a group of primary optical elements (2120) of the second system (2000). In some embodiments, an alignment between the first system (1000) and the second system (2000) may be calibrated. In some embodiments, the computer-readable instructions may further comprise calculating the corresponding position on the light source for each pixel in the camera sensor for each system. The computer-readable instructions may further comprise calculating a wavefront slope of the optical surface (1) based on the corresponding position of each pixel and a focal length of a group of primary optical elements (1120) of the first system (1000) and a group of primary optical elements (2120) of the second system (2000). The computer-readable instructions may further comprise producing a wavefront error map of the optical surface (1) using at least the wavefront slope and the corresponding position of each pixel of the second system (2000). The computer-readable instructions may further comprise producing a measurement of parallelism based on a thin prism defection equation applied to the wavefront error map.

In some embodiments, the group of primary optical elements (120) may comprise a collimating lens or lens group, or mirror/mirror group, or some combination thereof configured as a collimating optical group. In some embodiments, the one or more secondary optical elements (140) may additionally comprise one or more lenses or mirrors. In some embodiments, the one or more computing devices (200) may be communicatively coupled to the camera sensor (150) by a wired connection, a wireless connection, or a combination thereof. In some embodiments, the processing functionality of the present system may be executed entirely on the camera sensor (150), entirely on the one or more computing devices (200), or split between the two in some proportion.

In some embodiments, the system (300) of the present invention may comprise multiple instances of the systems described herein, for example, a first system (1000) and a second system (2000). It should be noted that any number of systems may be implemented in an embodiment of the present invention such that each system is optically coupled to and configured to measure some portion of the optical surface. For example, each system may be configured to measure a side of an optical surface (e.g., a plane, a cube, any three-dimensional shape). In other embodiments, each system may be configured to measure a portion of a optical surface (e.g., a surface sub-divided into a grid such that each system is configured to measure a quadrant of the surface). These embodiments may be freely combined.

In some embodiments, the first system (1000) of the multi-unit system (300) may comprise a light source (1110) configured to generate light based on a spatially encoded structured light pattern, defining a transmission path. The system (1000) may further comprise a group of primary optical elements (1120) optically coupled to the light source (1110) and the optical surface (1), configured to convert the light into angularly encoded light and direct the light to the optical surface (1) such that the angularly encoded light encodes source angles of the optical surface (1), the source angles comprising one or more chief ray angles. The optical surface (1) may reflect the angularly encoded light back toward the group of primary optical elements (1120), defining a reflected path. The group of primary optical elements (1120) may be further configured to collect and focus the reflected angularly encoded light onto an image plane of the group of primary optical elements (1120). The system (100) may further comprise an aperture stop (1130) located at the image plane, configured to make an object space of the system (1000) substantially telecentric such that the one or more chief ray angles are made parallel. The system (1000) may further comprise one or more secondary optical elements (1140) optically coupled to the image plane, configured to relay the image plane. The system (1000) may further comprise a camera sensor optically coupled to the one or more secondary optical elements (1140), configured to receive the image plane and measure the one or more properties of the optical surface (1) based on the encoded source angles. The system (1000) may further comprise a beamsplitter (1160).

In some embodiments, the second system (2000) of the multi-unit system (300) may comprise a light source (2110) configured to generate light based on a spatially encoded structured light pattern, defining a transmission path. The system (2000) may further comprise a group of primary optical elements (2120) optically coupled to the light source (2110) and the optical surface (1), configured to convert the light into angularly encoded light and direct the light to the optical surface (1) such that the angularly encoded light encodes source angles of the optical surface (1), the source angles comprising one or more chief ray angles. The optical surface (1) may reflect the angularly encoded light back toward the group of primary optical elements (2120), defining a reflected path. The group of primary optical elements (2120) may be further configured to collect and focus the reflected angularly encoded light onto an image plane of the group of primary optical elements (2120). The system (2000) may further comprise an aperture stop (2130) located at the image plane, configured to make an object space of the system (2000) substantially telecentric such that the one or more chief ray angles are made parallel. The system (2000) may further comprise one or more secondary optical elements (2140) optically coupled to the image plane, configured to relay the image plane. The system (2000) may further comprise a camera sensor optically coupled to the one or more secondary optical elements (2140), configured to receive the image plane and measure the one or more properties of the optical surface (1) based on the encoded source angles. The system (2000) may further comprise a beamsplitter (2160). In general, each system implemented in the multi-unit system (300) may comprise any combination of features described throughout the present invention, such as camera sensors, additional optical elements, computing devices, etc. The optical surface (1) may comprise a reflective surface, a refractive surface, or a combination thereof. The group of primary optical elements (120) may comprise one or more optical elements.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principles disclosed by the following illustrative examples. Other embodiments will become apparent from the following detailed description considered in conjunction with the accompanying drawings. It is to be understood, however, that the drawings are designed as an illustration only and not as a definition of the limits of any of the embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the features or other configuration descriptions may be used in any combination or configuration and are not necessarily limited to the configurations presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Most optical surface metrology systems fall into two categories: depth measuring or slope measuring. Depth measuring systems, like interferometry or point by point devices (like confocal or capacitive sensors) directly output depth information, using a variety of optical phenomena like interference or chromatic aberration. Slope measuring systems, like deflectometry and autocollimators, use triangulation to determine the normal vector of a surface at a particular point, and integrate the surface normals to recover the surface depth. Deflectometry, while useful for many applications, especially for measuring mid- to high-spatial frequencies on freeform surfaces, suffers from a number of practical issues. It uses triangulation between the locations of a screen, the object under test, and a camera sensor to obtain the surface slope. However, calibrating for the screen position (which is not typically directly seen by the camera) and solving for the object location (which has an infinite number of solutions along a camera ray) make it incredibly challenging to obtain accurate low order shape without significant additional hardware and complicated calibration algorithms. In addition, those systems are often off-axis, adding slope integration over a non-uniform grid to the list of challenges.

Autocollimators work in a similar way, but where the source is encoded as an angle, not as a position. When light from a point source is collimated by an autocollimator, reflected from a test surface and refocused back to an image plane, the displacement of the focused source from the center axis directly determines the surface slope relative to the optical axis of the autocollimator:

$$\alpha = \frac{1}{2}\left(\frac{h}{f}\right)$$

Where h is the displacement, f is the focal length of the collimating lens, and α is the surface slope relative to the axis of the collimating lens.

If the surface under test for an autocollimator is not flat, the returned light will be spread across the sensor or reticle, making it impossible to discern which part of the surface belongs to which height displacement, and therefore making the slope ambiguous. One could find the centroid of the returned light to estimate the average surface slope.

Figure 3:
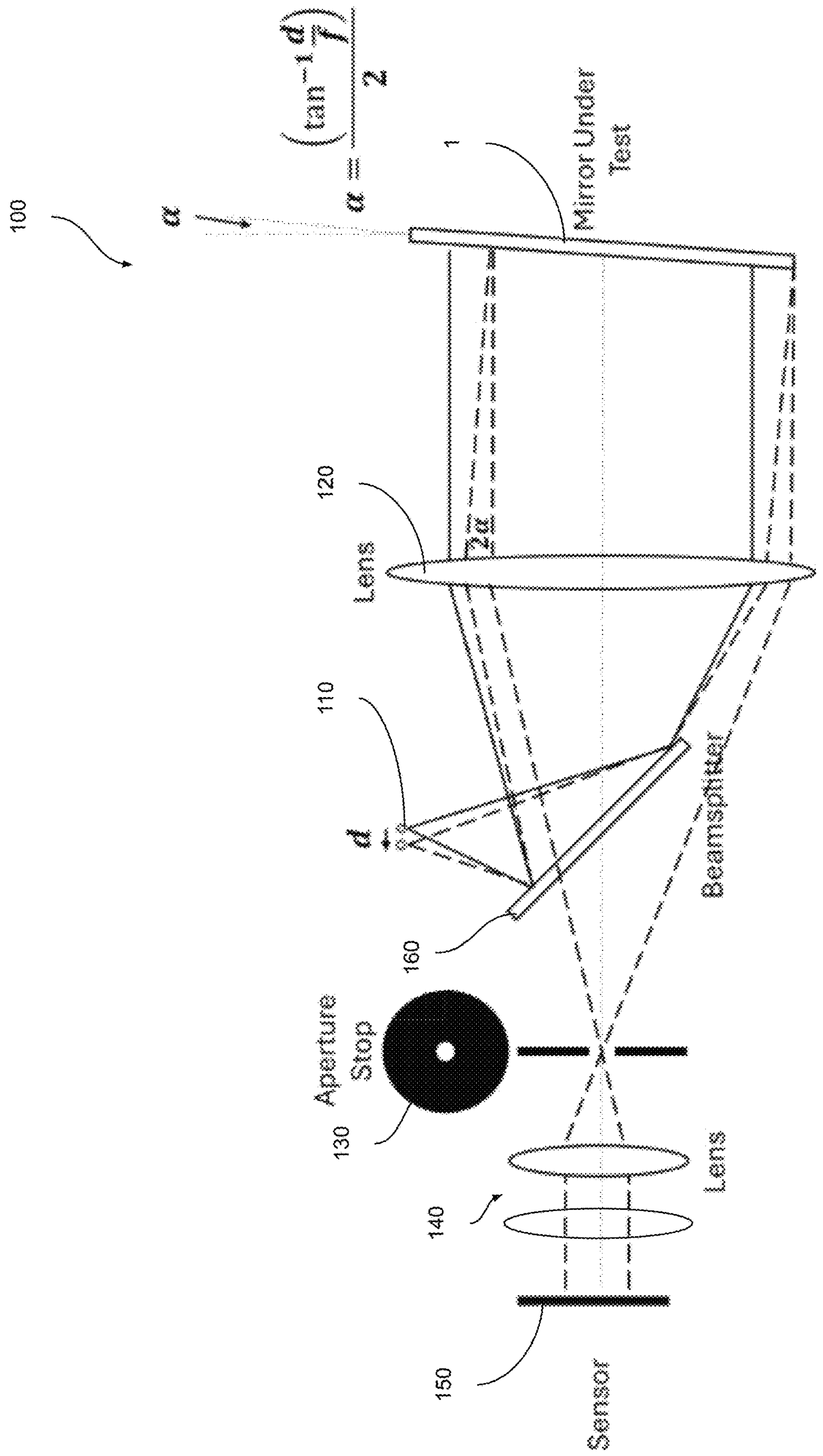
FIG. 3 shows a schematic view of an autocollimator with a stop located at the focal plane of the collimating lens. In accordance with various embodiments, the point source is translated by a known distance such that the light reflected from the surface under test passes through the stop and directly calculates the surface slope.
Figure 4A:
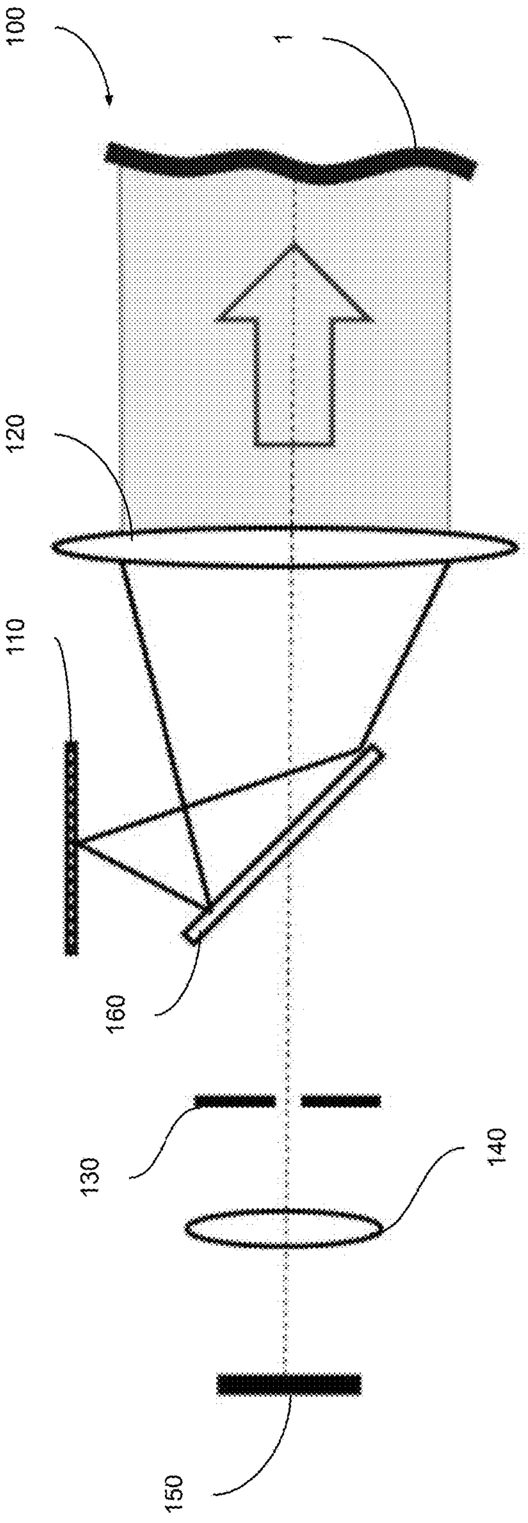
FIGS. 4A-4C show schematic views of a particular embodiment that identifies the locations on the object under test where the surface is normal to the optical axis.
Figure 4B:
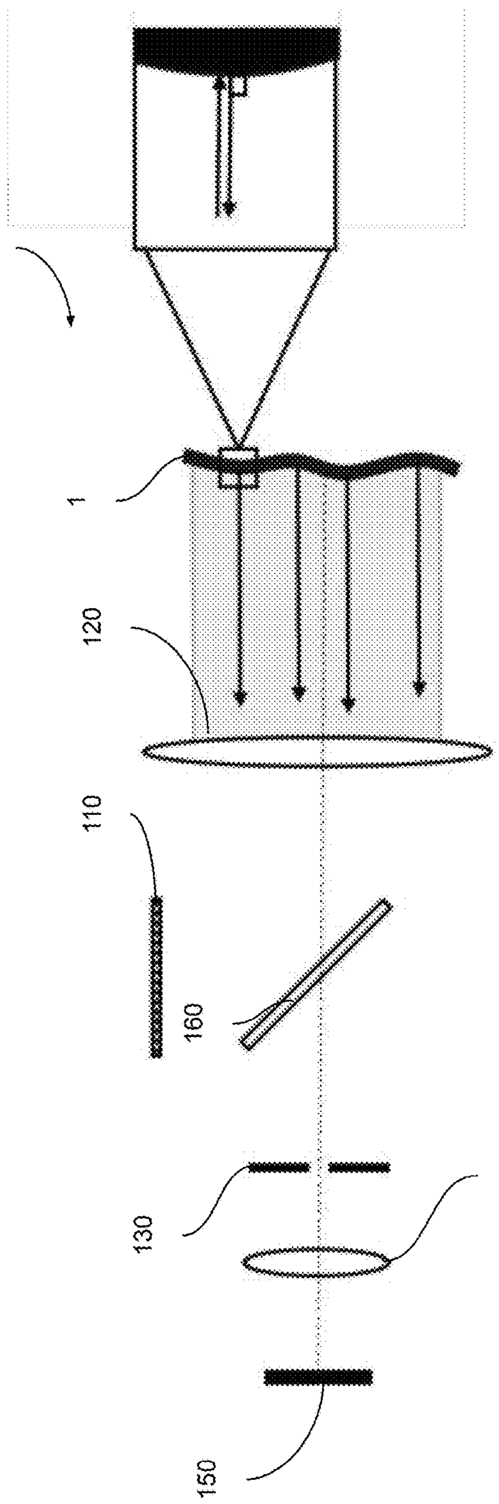
Figure 4C:
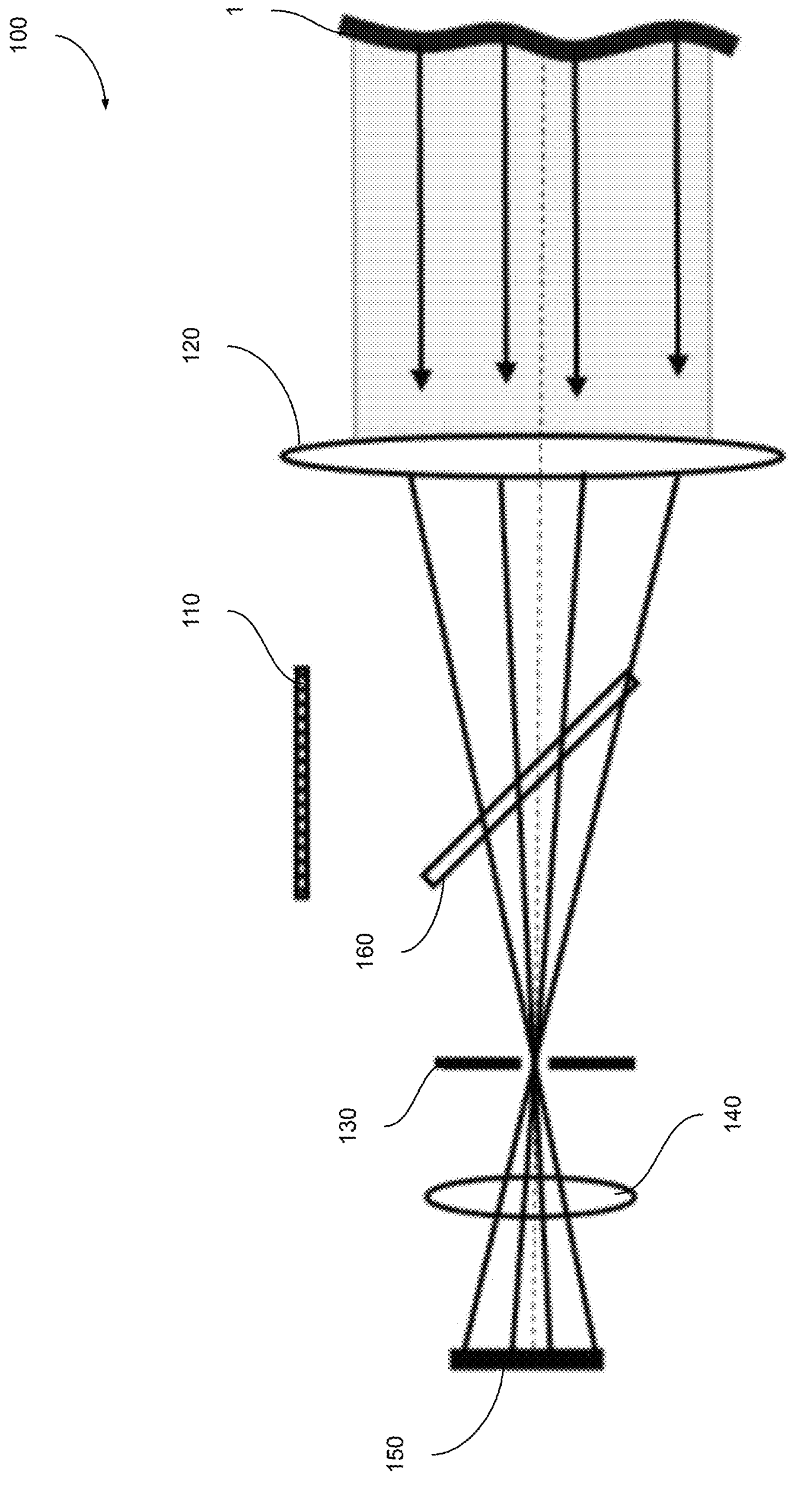
Figure 5A:
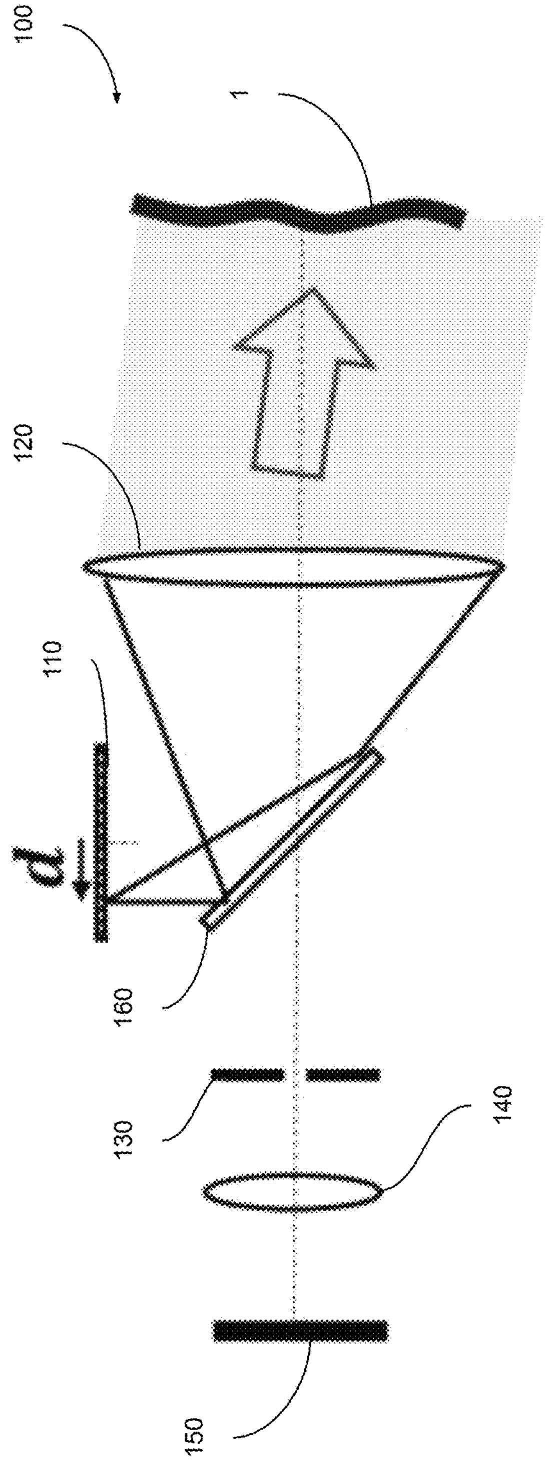
FIGS. 5A-5C show schematic views of a particular embodiment that uses an off-axis location on the source display to identify the locations on the object under test where the surface normal has a slope of angle α with respect to the optical axis.
Figure 5B:
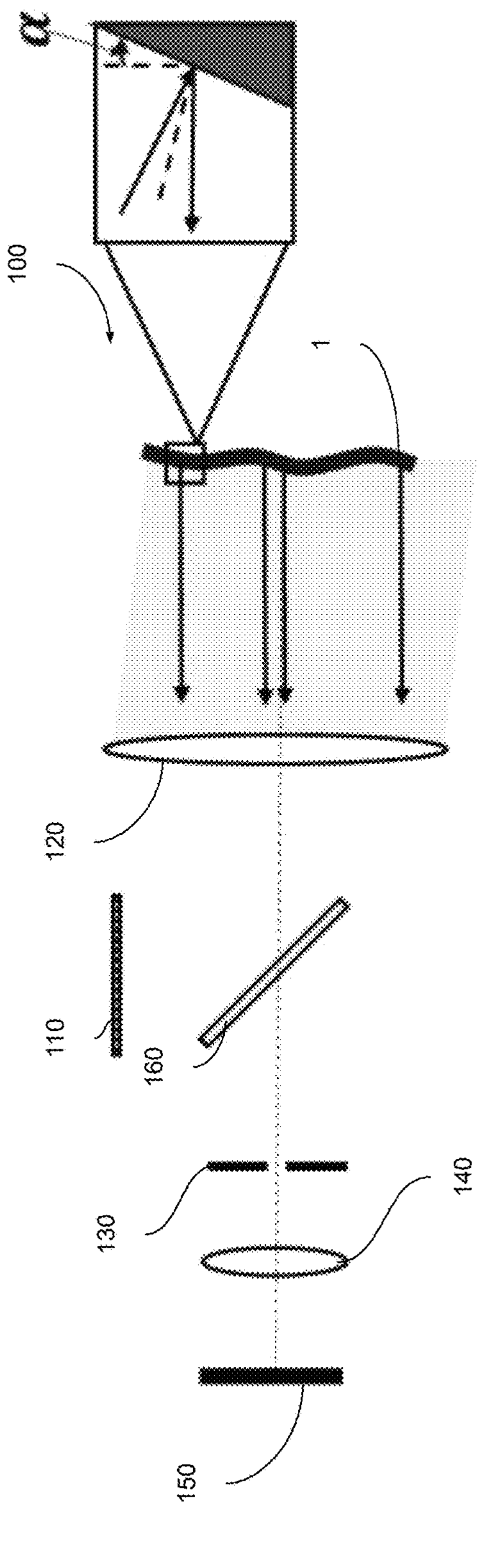
Figure 5C:
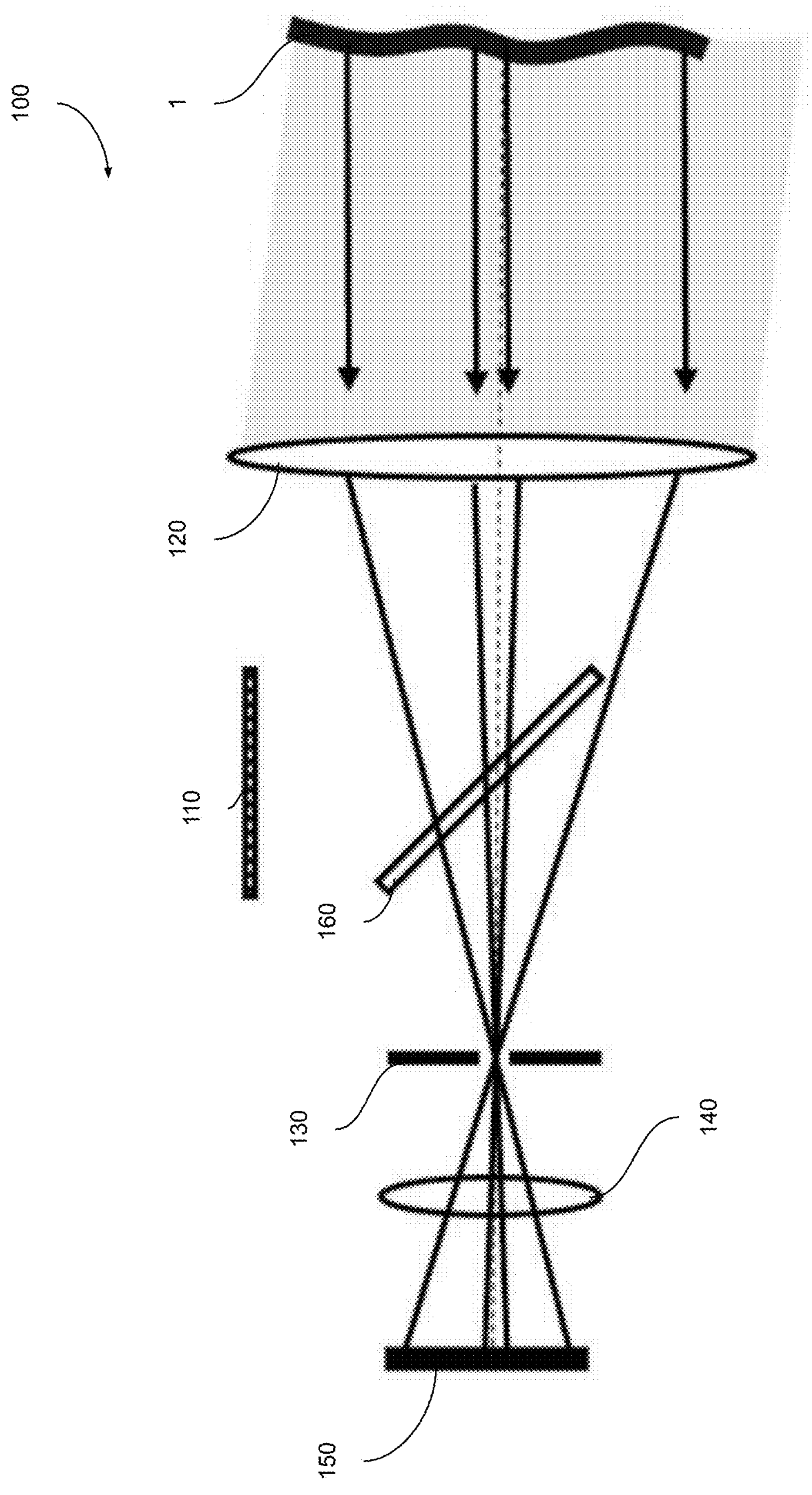

The structured light autocollimator (SLA) disclosed for the first time herein allows for the discernment of which part of a test surface caused what height displacement of the source. The present invention features two novel ways to achieve this. The first one is to place an aperture stop instead of a reticle at the focal position of the collimating optics. This forces the system to only allow chief rays that are substantially parallel to the optical axis to enter the system and reach the sensor, making the system substantially object-space telecentric. This would mean, however, that for a single source point, only one surface slope can direct light into the camera sensor. If the surface does not have that slope, no light would be seen from that portion of the surface (shown in FIG. 2). The source position would instead have to be displaced to measure a different surface slope, as shown in FIG. 3. If displaced by a known amount, then the slope of the surface at various points can be found as a function of source displacement. Thus, the position of the source is encoded to a slope. It would be unrealistic to scan a single point source to cover all possible displacements (surface slopes).

This is where the second novel improvement comes in, which is placing a spatially encoded pattern at the source location. By introducing a spatially encoded pattern, each source ‘displacement’, and therefore surface slope, can be given a unique identifier by a pattern or series of patterns. In some embodiments, this would eliminate the need to move the source. This system is shown in FIGS. 4A-4C and 5A-5C.

The equation for the slope of the surface at each point is nearly identical to the original autocollimator equation:

$$\alpha = \frac{1}{2}\left(\frac{d}{f}\right)$$

Where d is the displacement of the source.

Determining d is dependent on the spatial encoding method, which can be a binary encoding, phase encoding, or any other spatial encoding scheme. One example is by using the N-step phase shifting method, with sinusoidal patterns in the x and y directions to encode x and y positions on the source.

$$I_n^x(x, y) = \frac{A}{2} + A\cos\left(\frac{2\pi x}{T} + \frac{2\pi(n-1)}{N}\right)$$

$$I_n^y(x, y) = \frac{A}{2} + A\cos\left(\frac{2\pi y}{T} + \frac{2\pi(n-1)}{N}\right)$$

Where A is the amplitude, T is the fringe period in physical units, n is the current phase step, and N is the total number of steps. The wrapped phase in x and y can be calculated with:

$$\phi_{wrapped}^x(x, y) = \left(\frac{\sum_{n=0}^{N-1} I_n^x(x, y)\sin\left(\frac{2\pi n}{N}\right)}{\sum_{n=0}^{N-1} I_n^x(x, y)\cos\left(\frac{2\pi n}{N}\right)}\right)$$

$$\phi_{wrapped}^y(x, y) = \left(\frac{\sum_{n=0}^{N-1} I_n^y(x, y)\sin\left(\frac{2\pi n}{N}\right)}{\sum_{n=0}^{N-1} I_n^y(x, y)\cos\left(\frac{2\pi n}{N}\right)}\right)$$

The wrapped phase in x and y encodes every position on the source with a unique combination of x and y phase values. If the fringe period extends to the size of the source, then no unwrapping is required. If it does, a temporal phase unwrapping method can be used.

The displacement in x and y is given by:

$$d_x(x, y) = \frac{T * \phi_{wrapped}^x(x, y)}{2\pi}$$

$$d_y(x, y) = \frac{T * \phi_{wrapped}^y(x, y)}{2\pi}$$

Where T is the fringe period in physical units (e.g. mm). And thus, the slope of the surface in x and y is given by $$S_x(x, y) = \left(\frac{d_x(x, y)}{2f}\right)$$

$$S_y(x, y) = \left(\frac{d_y(x, y)}{2f}\right)$$

The height map can be calculated by integrating $S_x$ and $S_y$ along with x any y by using a modal or zonal integration method.

$$Z = \text{integrate}\,(S_x, S_y, x, y)$$

As with any optical metrology system, following analysis on the height Z of the surface may be done by at least fitting to Zernike polynomials, spatial filtering, calculating radius of curvature, cropping etc.

To produce accurate measurements of the object under test, the proposed system must be calibrated for systematic error. In actual constructed systems, there are practical errors that will affect reconstruction accuracy. These factors include alignment of the structured light source, aberrations in the collimating path, optical distortion in the imaging lens, errors in the expected focal length of the collimating lens, and errors in the construction of the structured light source or the camera sensor, such as pixel size. Additionally, as with other metrology systems, retrace error (different light paths taken through the system depending on the surface being measured) also affects measurement accuracy.

These errors affect the slope calculation in X and Y, and these slope errors are themselves slope dependent and coordinate dependent. Thus, the slope error is given by:

$$S_{x,error}(S_x, S_y, x, y) = F_{x,error}(S_x, S_y, x, y)$$

$$S_{y,error}(S_x, S_y, x, y) = F_{y,error}(S_x, S_y, x, y)$$

Where some function $F_{x,error}$ and $F_{y,error}$ describes the varying slope error. The 4-input functions are difficult to evaluate, determine, and apply.

The present invention features the following method. A reference flat mirror is positioned within the measurement field of the system. The mirror is sequentially oriented at a plurality of known tip-and-tilt angles using a precision tilt stage. For each orientation, the system acquires a slope-measurement image comprising a measured slope in the X-direction and a measured slope in the Y-direction at each pixel position (u,v) across the imaging aperture.

Here, $$S_x^{meas}(u, v) \text{ and } S_y^{meas}(u, v)$$

denote the measured slope components in the X- and Y-directions, respectively, at image coordinates (u,v). Because the reference surface is planar at each orientation, the true slope at every pixel for a given orientation is taken as the per-orientation mean of the measured slopes across all pixels. Thus, the slope error at each pixel is defined as:

$$\Delta x(u, v) = S_x^{meas}(u, v) - S_x^*$$

$$\Delta y(u, v) = S_y^{meas}(u, v) - S_y^*$$

$\Delta x(u, v)$ and $\Delta y(u, v)$ represent the slope-error components at each pixel, corresponding to the difference between the measured and reference slopes.

$$S_x^*$$

and $$S_y^*$$

represent the reference slopes, computed as the mean of all measured slopes across the aperture for each mirror orientation:

$$S_x^* = (1/N)\Sigma S_x^{meas}(u, v)$$

$$S_y^* = (1/N)\Sigma S_y^{meas}(u, v)$$

For each pixel (u,v), the measured slope error in each direction is modeled as a bivariate polynomial (i.e., 3rd, 4th, 5th, etc. order polynomial) of the measured slope components. Each pixel has a set of polynomial coefficients c_x, ij(u,v) and c_y,ij(u,v) describing the relationship between the measured slopes and slope error, where i and j denote the polynomial powers. The function $$b\left(S_x^{meas}, S_y^{meas}\right)$$

denotes the vector of polynomial basis terms (e.g., $$1, S_x, S_y, S_x^2, S_xS_y, S_y^2, \text{ etc.}).$$

$$\Delta x(u, v) = \Sigma c\_\{x, ij\}(u, v) \cdot [S_x^{meas}]^i \cdot \left[S_y^{meas}\right]^j, i + j \le m$$

$$\Delta y(u, v) = \Sigma c\_\{y, ij\}(u, v) \cdot [S_x^{meas}]^i \cdot \left[S_y^{meas}\right]^j, i + j \le m$$

Where m is the maximum power of the polynomial.

Since the systematic error is assumed to be generally smooth, the polynomial coefficients can be compressed for data efficiency. Each polynomial coefficient map is represented as a weighted sum of Zernike modes over the normalized aperture:

$$c_{x,k}(u, v) \approx \Sigma w_{x,kn} \cdot Z_n(u, v), k = 1 \ldots K$$

$$c_{y,k}(u, v) \approx \Sigma w_{y,kn} \cdot Z_n(u, v), k = 1 \ldots K$$

Where $$K = \frac{(m + 1)(m + 2)}{2}$$

is the number of terms from an mth order bivariate polynomial.

In these expressions, $c_{x,k}(u, v)$ and $c_{y,k}(u, v)$ represent the k-th polynomial-coefficient fields, while $w_{x,kn}$ and $w_{y,kn}$ are Zernike weights corresponding to the n-th Zernike mode $Z_n(u, v)$ compressing each k-th polynomial-coefficient field.

Reconstruct coefficients, predict slope error via the polynomial basis, and subtract to obtain corrected slopes.

$$S_x^{corr}(u, v)$$

and $$S_y^{corr}(u, v)$$

denote the corrected slopes obtained after subtracting the predicted slope-error components from the measured slopes:

$$c_x(u, v) = \Sigma w_{x,*n} \cdot Z_n(u, v);\ c_y(u, v) = \Sigma w_{y,*n} \cdot Z_n(u, v)$$

$$\Delta x(u, v) = c_x(u, v)^T \cdot b\left(S_x^{meas}, S_y^{meas}\right);\ \Delta y(u, v) = c_y(u, v)^T \cdot b\left(S_x^{meas}, S_y^{meas}\right)$$

$$S_x^{corr} = S_x^{meas} - \Delta x;\ S_y^{corr} = S_y^{meas} - \Delta y$$

In these equations, $$b\left(S_x^{meas}, S_y^{meas}\right)$$

denotes the vector of polynomial basis terms up to the selected order m (e.g., $$1, S_x, S_y, S_x^2, S_xS_y, S_y^2, \ldots, S_y^m).,$$

and $c_x(u, v)$, $c_y(u, v)$ are the reconstructed per-pixel coefficient vectors determined from the Zernike representation. The dot product $$c_x^T b$$

and $$c_y^T b$$

yields the predicted slope error components $\Delta_x$, $\Delta_y$. Subtracting these from the measured slopes produces corrected slope components $$S_x^{corr}, S_y^{corr}.$$

It is important to note that the measurement slope dynamic range is simply based on the size of the source and the focal length of the collimating optic:

$$S_{max} = \pm \frac{\left(\frac{H}{f}\right)}{2}$$

Where H is the half width of the source. This results in a much higher dynamic range than nearly any interferometer. Compared to other methods like deflectometry, this system will have less dynamic range but far improved low-order shape accuracy and ease of calibration. To increase dynamic range, one can either increase the size of the source, or decrease the focal length.

This metrology system has broad applicability across semiconductor manufacturing, precision optics, aerospace applications, and more. The innovation described here is simply to give an example of a general implementation of the innovation. The steps below are just one embodiment to describe a measurement process. For example, using the spatial encoding method as described below. The method may comprise triggering a measurement with a computational device. The method may further comprise the generation of spatially encoded pattern sequence, e.g. 5 phase steps in x and y. The method may further comprise displaying each pattern in the sequence and capturing an image of that pattern reflected from the surface under test on the camera sensor. The method may further comprise converting the images of the patterns in the x direction to $$\phi_{wrapped}^x$$

and $$\phi_{wrapped}^y$$

using the N-step phase wrapped phase function. The method may further comprise converting the phases to displacements. The method may further comprise converting the displacements to surface slopes. The method may further comprise correcting the surface slopes with the calibration data. The method may further comprise integrating the slope to recover the depth map. The method may further comprise performing analysis on the depth map.

The system can additionally be used to measure Total Thickness Variation (TTV). Using at least two structured light autocollimator systems facing one another, the correspondence between each system can be found. For example, two systems are considered, namely unit 1 and unit 2. In order to perform a measurement of TTV, the two systems must be calibrated relative to each other (shown in FIGS. 6A-6B) by projecting a sequence of spatially encoded patterns from unit 1 to unit 2. The unit 2 camera captures images of the source in unit 1, and using the pattern determines the location on the unit 1 display where they originated ($P_{1\rightarrow 2}$) for each pixel in x and y on the unit 2 camera and stores these values for reference. The same process is done in reverse, projecting a sequence of spatially encoded patterns from unit 2 to unit 1. The unit 1 camera captures those images, and using the pattern determines the location on the unit 2 display where they originated ($P_{2\rightarrow 1}$) for each pixel in x and y on the unit 1 camera and stores these values for reference.

When an opaque but dual sided reflective object is placed in between unit 1 and 2, for example a wafer, as shown in FIG. 7, unit 1 can measure side 1 and unit 2 can measure side 2 simultaneously as described previously for a single structured light autocollimator system. Before slope integration for each side, the measured slopes from each side need to be tilted relative to the other based on the system calibration to achieve the true TTV. One way to do this is by using the calibrated values ($P_{1\rightarrow 2}$) and ($P_{2\rightarrow 1}$) along with the displacement measured for each pixel from each unit, $P_1(x, y)$ and $P_2(x, y)$ to apply adjustments to the measured surface slopes from each unit.

$$\delta S_{x1} = \left(\frac{(P_{1\rightarrow 2} - P_1(x, y))_x}{f}\right)$$

$$\delta S_{y1} = \left(\frac{(P_{1\rightarrow 2} - P_1(x, y))_y}{f}\right)$$

-continued $$\delta S_{x2} = \left(\frac{(\underline{P}_{2\to 1} - P_2(x, y))_x}{f}\right)$$

$$\delta S_{y2} = \left(\frac{(\underline{P}_{2\to 1} - P_2(x, y))_y}{f}\right)$$

Where subscript x and y denote the x component and y component of the source displacement. After integration of the slopes for each unit, subtracting the surface maps from each side reveals the TTV.

Additionally, the structured light autocollimator system can be used in a transmission configuration to measure transmitted wavefront error. By placing a transparent surface under test (e.g. a window) in between two structured light autocollimator systems, ray deviation can be calculated from the change in displacement from the structured light autocollimator systems with an object under test, and without an object under test. FIGS. 8A-8B demonstrates a simplified example of a window with a wedge. To perform this measurement, at least the following steps can be done.

These steps may comprise projecting a sequence of spatially encoded patterns from unit 1 to unit 2. The unit 2 camera captures those images, and using the pattern determines the location on the unit 1 display where they originated ($P_{1\to 2}$) for each pixel in x and y on the unit 2 camera and stores these values for reference. The steps may further comprise placing the object under test in the path between the two structured light autocollimator systems. The steps may further comprise again projecting a sequence of spatially encoded patterns from unit 1 to unit 2 through the object under test. The unit 2 camera captures those images, and using the pattern determines the location on the unit 1 display where they originated ($P_2$) in x and y on the unit 2 camera. Wavefront slopes can now be calculated by finding the displacement of the source for each pixel in x and y on the unit 2 camera $$S_x(x, y) = \left(\frac{(P_{1\to 2}(x, y) - P_2(x, y))_x}{f}\right)$$

$$S_y(x, y) = \left(\frac{(P_{1\to 2}(x, y) - P_2(x, y))_y}{f}\right)$$

Where subscript x and y denotes the x component and y component of the source displacement. Integrating these wavefront slopes reveals the transmitted wavefront error:

$$W(x, y) = \text{integrate}(S_x, S_y, x, y)$$

Additionally, the wavefront slopes directly represent ray deviation, δ. One could calculate the planarity of the object under test using at least the thin prism equation:

$$\delta \approx (n-1)\alpha$$

Where α is the planarity, or wedge angle, and n is the refractive index of the material.

The structured light telecentric autocollimator (SLA) introduces a novel approach to high-resolution slope measurement, addressing critical limitations in existing optical metrology techniques. Conventional methods, such as interferometry and deflectometry, struggle with calibration complexity, sensitivity to environmental factors (especially vibration), and challenges in measuring low-order surface shapes with precision. By integrating structured light encoding and a substantially telecentric optical design, the structured light autocollimator overcomes these limitations, enabling accurate, high-dynamic-range surface measurements with improved ease of calibration. This innovation is particularly significant for applications requiring precise surface characterization with high throughput and high dynamic range, such as semiconductor manufacturing, advanced optics, and next-generation AR/VR displays, and is expected to have significant impacts. The ability to achieve high-resolution slope data and reconstruct surface profiles with greater accuracy ensures that critical optical components meet increasingly stringent performance requirements, facilitating advancements in astronomy, biomedical imaging, and nanotechnology.

Any software-based logic, algorithm, or application described herein may be stored and executed using a non-transitory computer-readable medium, which serves as a storage mechanism for retrieval and execution by an instruction execution system, such as a processor within a computing device. A computer-readable medium may encompass various forms of physical storage, including but not limited to magnetic, optical, or semiconductor-based media. Examples include magnetic tapes, floppy disks, hard drives, memory cards, solid-state drives, USB flash drives, and optical discs.

Additionally, volatile and non-volatile memory types such as static random access memory (SRAM), dynamic random access memory (DRAM), magnetic random access memory (MRAM), read-only memory (ROM), programmable read-only memory (PROM), erasable programmable read-only memory (EPROM), and electrically erasable programmable read-only memory (EEPROM) may also serve as computer-readable media.

Moreover, the described logic or application may be structured and implemented in various configurations. It may be organized as independent modules, components of a single application, or distributed across multiple computing devices. Execution may occur on a single device, across multiple interconnected devices, or within a shared network environment. Furthermore, in distributed computing environments, a collection of storage devices—such as storage area networks, distributed file systems, or clustered databases—may collectively function as a single non-transitory computer-readable medium, facilitating efficient data access and execution across multiple systems.

In some embodiments, the Structured Light Autocollimator (SLA) may produce millions of independent slope measurements per capture sequence, compared to a single average slope from a conventional autocollimator or point-by-point scanning from confocal or triangulation systems (e.g., interferometers). After slope integration and calibration correction, the SLA may achieve nanometer-level surface form accuracy with sub-microradian angular resolution, comparable to interferometric precision but with far greater robustness to vibration and air turbulence. The present invention has demonstrated <0.01 nm Repeatability of RMS without a laboratory environment, which is more repeatable than interferometers in a laboratory environment. The slope measurement range may be determined by the display size and collimator focal length, yielding tens to hundreds of milliradians of measurable slope—an order of magnitude greater than typical interferometers, which alias and/or reduce measurement reliability before reaching even a milliradian of slope deviation.

Each full-field capture may require only a few phase steps per axis, enabling complete surface profiling in under a second with a standard framerate camera, compared to minutes or hours for point-scanning systems or mechanically scanning systems. Because the system measures angular deviation instead of optical path length, it may operate accurately under typical factory conditions without significant vibration isolation or controlled air environments. The per-pixel polynomial and Zernike compression calibration model may provide sub-microradian correction accuracy with only a one-time reference flat measurement sequence, reducing calibration effort from hours to minutes. That calibration may be applied nearly instantly with a Hadamard product on a modern computer.

The computer system can include a desktop computer, a workstation computer, a laptop computer, a netbook computer, a tablet, a handheld computer (including a smartphone), a server, a supercomputer, a wearable computer (including a SmartWatch™), or the like and can include digital electronic circuitry, firmware, hardware, memory, a computer storage medium, a computer program, a processor (including a programmed processor), an imaging apparatus, wired/wireless communication components, or the like. The computing system may include a desktop computer with a screen, a tower, and components to connect the two. The tower can store digital images, numerical data, text data, or any other kind of data in binary form, hexadecimal form, octal form, or any other data format in the memory component. The data/images can also be stored in a server communicatively coupled to the computer system. The images can also be divided into a matrix of pixels, known as a bitmap that indicates a color for each pixel along the horizontal axis and the vertical axis. The pixels can include a digital value of one or more bits, defined by the bit depth. Each pixel may comprise three values, each value corresponding to a major color component (red, green, and blue). A size of each pixel in data can range from 8 bits to 24 bits. The network or a direct connection interconnects the imaging apparatus and the computer system.

The term "processor" encompasses all kinds of apparatus, devices, and machines for processing data, including by way of example a programmable microprocessor, a microcontroller comprising a microprocessor and a memory component, an embedded processor, a digital signal processor, a media processor, a computer, a system on a chip, or multiple ones, or combinations, of the foregoing. The apparatus can include special-purpose logic circuitry, e.g., an FPGA (field programmable gate array) or an ASIC (application-specific integrated circuit). Logic circuitry may comprise multiplexers, registers, arithmetic logic units (ALUs), computer memory, look-up tables, flip-flops (FF), wires, input blocks, output blocks, read-only memory, randomly accessible memory, electronically-erasable programmable read-only memory, flash memory, discrete gate or transistor logic, discrete hardware components, or any combination thereof. The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The processor may include one or more processors of any type, such as central processing units (CPUs), graphics processing units (GPUs), special-purpose signal or image processors, field-programmable gate arrays (FPGAs), tensor processing units (TPUs), and so forth.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, a data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, drives, or other storage devices). The operations described in this specification can be implemented as operations performed by a data processing apparatus on data stored on one or more computer-readable storage devices or received from other sources.

Program code embodied on a computer readable medium may be transmitted using any appropriate medium, including but not limited to wireless, wireline, optical fiber cable, R.F, Bluetooth, storage media, computer buses, etc., or any suitable combination of the foregoing. Computer program code for carrying out operations for aspects of the present disclosure may be written in any combination of one or more programming languages, including an object oriented programming language such as Java, Smalltalk, C#, Ruby, or the like, conventional procedural programming languages, such as Pascal, FORTRAN, BASIC, or similar programming languages, programming languages that have both object-oriented and procedural aspects, such as the "C" programming language, C++, Python, or the like, conventional functional programming languages such as Scheme, Common Lisp, Elixir, or the like, conventional scripting programming languages such as PHP, Perl, Javascript, or the like, or conventional logic programming languages such as PROLOG, ASAP, Datalog, or the like.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user.

Examples of input devices include a keyboard, cursor control devices (e.g., a mouse or a trackball), a microphone, a scanner, and so forth, wherein the user can provide input to the computer. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. Examples of output devices include a display device (e.g., a monitor or projector), speakers, a printer, a network card, and so forth. Display devices may include display devices that provide visual information, this information typically may be logically and/or physically organized as an array of pixels. In addition, a computer can interact with a user by sending documents to and receiving documents from a device that is used by the user; for example, by sending web pages to a web browser on a user's client device in response to requests received from the web browser.

An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. In some implementations, the interface may be a touch screen that can be used to display information and receive input from a user. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft® Windows Powershell that employs object-oriented type programming architectures such as the Microsoft® NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation®, a SPARC processor made by Sun Microsystems®, an Athlon, Sempron, Phenom, or Opteron processor made by AMD Corporation®, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related field will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation®; the Mac OS X operating system from Apple Computer Corp.®; a Unix® or Linux®-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

Connecting components may be properly termed as computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

Reference numbers recited herein, in the drawings, and in the claims are solely for ease of examination of this patent application and are exemplary. The reference numbers are not intended in any way to limit the scope of the claims to the particular features having the corresponding reference numbers in the drawings.

What is claimed is:

1. A system (100) for measurement of one or more properties of an optical surface (1), the one or more properties comprising slope, form, and total thickness variation, the system (100) comprising:

a) a light source (110) configured to generate spatially incoherent light through a spatially encoded structured light pattern, defining a transmission path;

b) a group of primary optical elements (120) optically coupled to the light source (110) and the optical surface (1), configured to convert the light into angularly encoded light and direct the light to the optical surface (1) such that the angularly encoded light encodes source angles of the optical surface (1), the source angles comprising one or more chief ray angles;

wherein the optical surface (1) reflects the angularly encoded light back toward the group of primary optical elements (120), defining a reflected path;

wherein the group of primary optical elements (120) is further configured to collect and focus the reflected angularly encoded light onto an image plane of the group of primary optical elements (120);

c) an aperture stop (130) located at the image plane, configured to make an object space of the system (100) substantially telecentric such that the one or more chief ray angles are made parallel;

d) one or more secondary optical elements (140) optically coupled to the image plane, configured to relay the image plane; and e) a camera sensor (150) optically coupled to the one or more secondary optical elements (140), configured to receive the image plane and measure the one or more properties of the optical surface (1) based on the encoded source angles.

2. The system (100) of claim 1 further comprising a beamsplitter (160) positioned between an image plane of the group of primary optical elements (120) and the group of primary optical elements (120) such that at least one light path of the light is transmitted and at least one light path of the light is reflected.

3. The system (100) of claim 1, wherein the aperture stop (130) is positioned at a focal plane of the one or more secondary optical elements (140) such that the object space of the system (100) is made bi-telecentric.

4. The system (100) of claim 1, wherein the light source (110) is positioned in the transmission path and the camera sensor (150) is positioned in the reflected path.

5. The system (100) of claim 1, wherein the light source (110) is positioned in the reflected path, and the camera sensor (150) is positioned in the transmission path.

6. The system (100) of claim 1 further comprising:

a) at least one computing device (200) communicatively coupled to the camera sensor (150), comprising a processor (210) configured to execute computer-readable instructions and a memory component (220) operatively coupled to the processor (210), comprising a set of computer-readable instructions that, when executed by the processor (210), cause the at least one computing device (200) to:

i) display the spatially encoded structured light pattern; and ii) acquire an image from the camera sensor (150) comprising the spatially encoded structured light pattern transmitted through the group of primary optical elements (120), reflected from the optical surface (1) to the camera sensor (150).

7. The system (100) of claim 6, wherein the computer-readable instructions further comprise:

a) calculating a corresponding position on the light source (110) for each pixel in the camera sensor (150) by converting angularly encoded light information from the light into spatially encoded information;

b) calculating the slope of the optical surface (1) based at least in part from the corresponding position of each pixel and a focal length of the group of primary optical elements (120); and c) producing a depth map of the optical surface (1) using at least the slope and the corresponding position of each pixel.

8. The system (100) of claim 7, wherein producing the depth map comprises integrating the slope using the corresponding position of each pixel.

9. The system (100) of claim 7, wherein calculating the corresponding position on the light source (110) for each pixel of the camera sensor (150) comprises using spatial phase unwrapping with a global phase reference, temporal phase unwrapping using multifrequency or multiwavelength methods, binary encoding, randomized binary coding, or a combination thereof.

10. The system (100) of claim 1, wherein the group of primary optical elements (120) comprises a collimating lens.

11. The system (100) of claim 1, wherein the one or more secondary optical elements (140) comprise one or more lenses.

12. A system (300) for measuring total thickness variation and object parallelism, the system (300) comprising:

a) a first system (1000) and a second system (2000), each defined by claim 8, positioned such that the first system (1000) is pointed directly at the second system (2000), wherein the optical surface (1) is positioned between the first system (1000) and the second system (2000) such that a first side faces the first system (1000) and a second side faces the second system (2000).

13. The system (300) of claim 12, wherein the optical surface (1) is located at a focal plane of a group of primary optical elements (1120) of the first system (1000) and a group of primary optical elements (2120) of the second system (2000).

14. The system (300) of claim 12 wherein an alignment between the first system (1000) and the second system (2000) is calibrated.

15. The system (300) of claim 14, wherein the computer-readable instructions further comprise:

a) calculating the corresponding position on the light source for each pixel in the camera sensor for each system;

b) calculating a surface slope of the optical surface (1) based on the corresponding position of each pixel and a focal length of a group of primary optical elements (1120) of the first system (1000) and a group of primary optical elements (2120) of the second system (2000);

c) producing a depth map of the optical surface (1) using at least the surface slope and the position of each pixel for each system; and d) producing a measurement of parallelism and total thickness variation using at least the calibrated alignment between the first system (1000) and the second system (2000).

16. A system (300) for measuring transmitted wavefront error, the system comprising:

a) a first system (1000) and a second system (2000), each defined by claim 8, positioned such that the first system (1000) is pointed directly at the second system (2000), wherein the optical surface (1) is positioned between the first system (1000) and the second system (2000) such that a first side faces the first system (1000) and a second side faces the second system (2000).

17. The system (300) of claim 16, wherein the optical surface (1) is located at a focal plane of a group of primary optical elements (1120) of the first system (1000) and a group of primary optical elements (2120) of the second system (2000).

18. The system (300) of claim 16 wherein an alignment between the first system (1000) and the second system (2000) is calibrated.

19. The system (300) of claim 18, wherein the computer-readable instructions further comprise:

a) calculating the corresponding position on the light source for each pixel in the camera sensor for each system;

b) calculating a wavefront slope of the optical surface (1) based on the corresponding position of each pixel and a focal length of a group of primary optical elements (1120) of the first system (1000) and a group of primary optical elements (2120) of the second system (2000);

c) producing a wavefront error map of the optical surface (1) using at least the wavefront slope and the corresponding position of each pixel of the second system (2000); and d) producing a measurement of parallelism based on a thin prism equation applied to the wavefront error map.

* * * * *